March 26, 1963 P. VULLIEZ 3,082,632
FLUIDTIGHT TRANSMISSION DEVICE FOR ROTARY SHAFTS
Filed Oct. 10, 1960 5 Sheets-Sheet 1
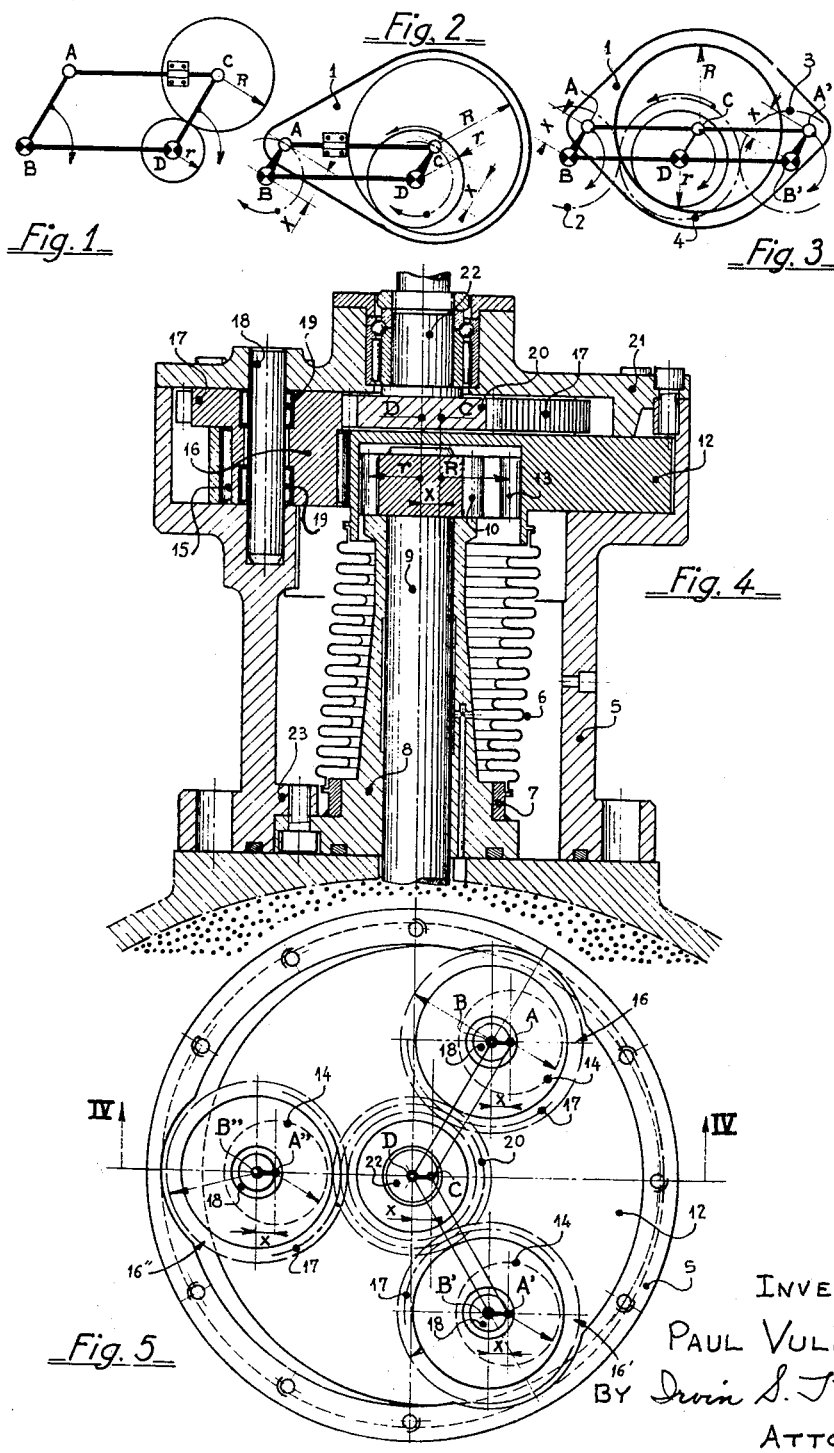
INVENTOR
PAUL VULLIEZ
BY Irvin S. Thompson
ATTORNEY March 26, 1963 P. VULLIEZ 3,082,632
FLUIDTIGHT TRANSMISSION DEVICE FOR ROTARY SHAFTS
Filed Oct. 10, 1960 5 Sheets-Sheet 2
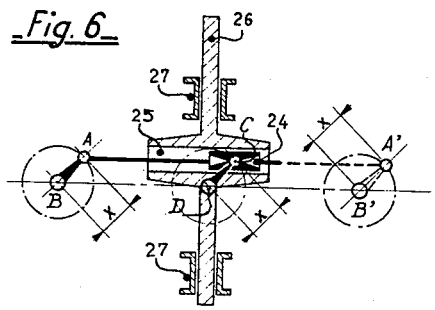
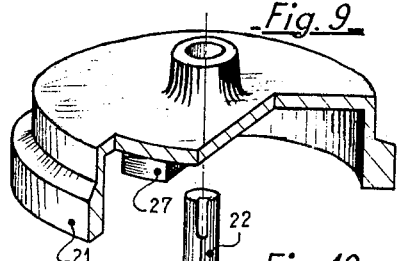
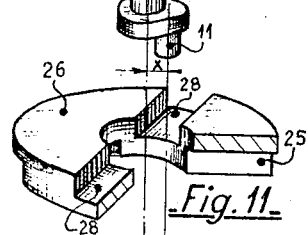
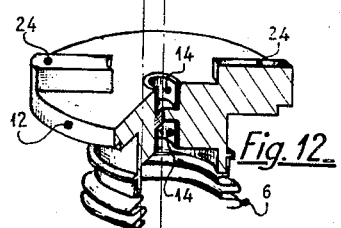
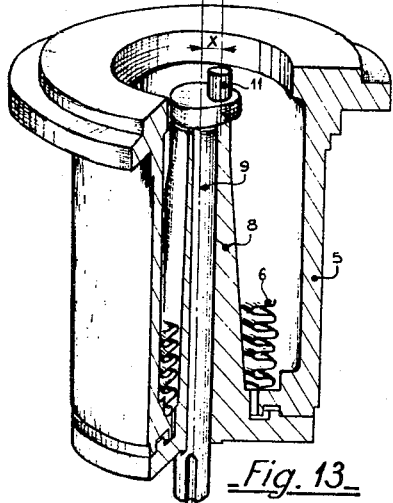
INVENTOR
PAUL VULLIEZ
By Irvin S. Thompson
ATTORNEY INVENTOR
PAUL VULLIEZ
BY Irwin S. Thompson
ATTORNEY March 26, 1963  P. VULLIEZ  3,082,632
FLUIDTIGHT TRANSMISSION DEVICE FOR ROTARY SHAFTS
Filed Oct. 10, 1960  5 Sheets-Sheet 4
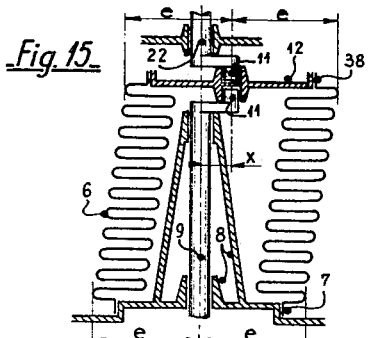
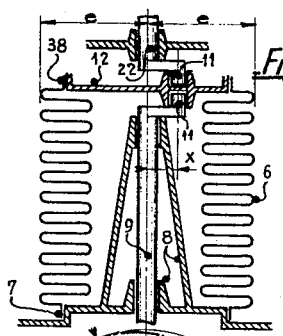
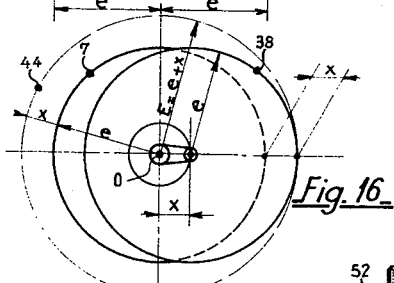
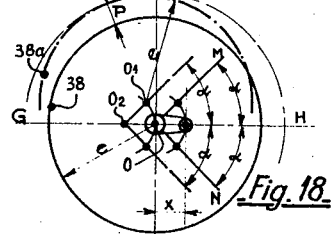
INVENTOR
PAUL VULLIEZ
BY Irwin S. Thompson
ATTORNEY March 26, 1963
P. VULLIEZ
3,082,632
FLUIDTIGHT TRANSMISSION DEVICE FOR ROTARY SHAFTS
Filed Oct. 10, 1960
5 Sheets-Sheet 5
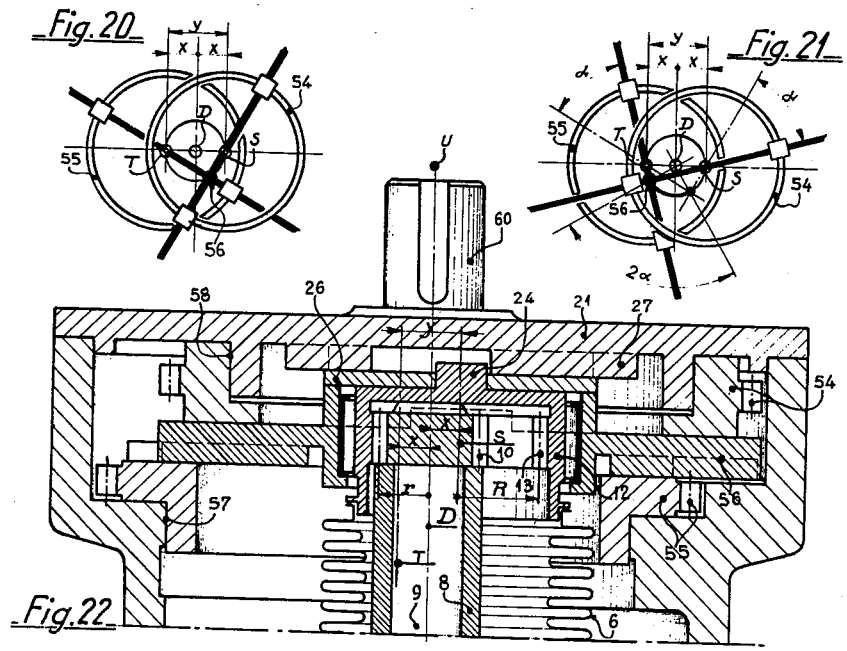
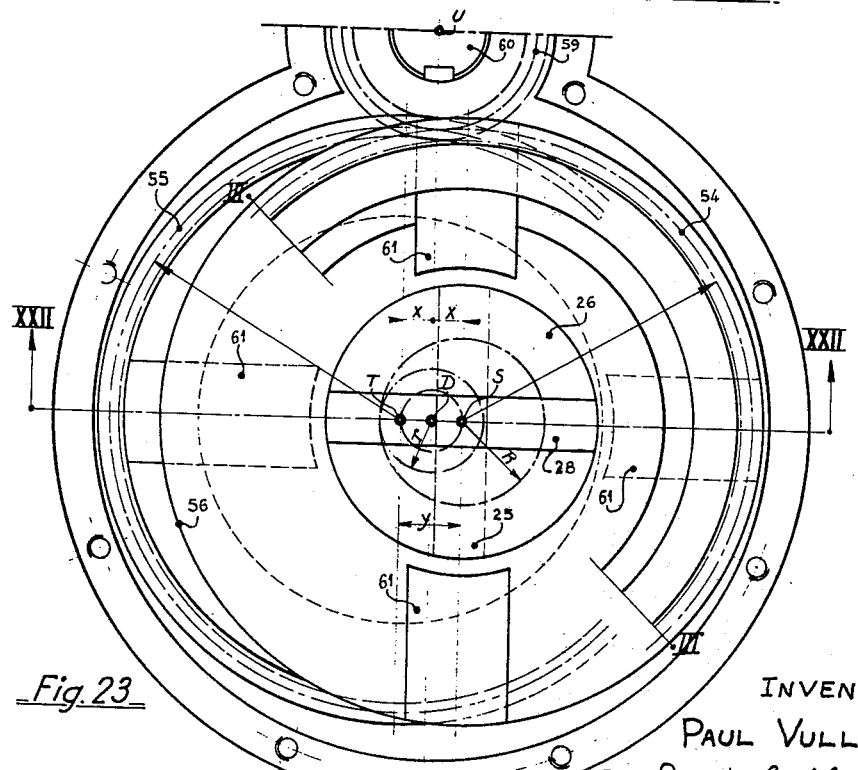
INVENTOR
PAUL VULLIEZ
BY Irwin S. Thompson
ATTORNEY United States Patent Office 3,082,632
Patented Mar. 26, 1963

3,082,632
FLUIDTIGHT TRANSMISSION DEVICE FOR ROTARY SHAFTS
Paul Vulliez, 48 Rte. de Rouen, Pont-Audemer, France
Filed Oct. 10, 1960, Ser. No. 61,727
Claims priority, application France Oct. 20, 1959
15 Claims. (Cl. 74—18.1)

My invention has for its object a fluidtight transmission device for connecting a driving rotary shaft with a driven rotary shaft, wherein a movable transfer member closes the end of bellows or of a Sylphon member, so as to separate fluidtightly from each other the media in which the two shafts revolve. The word "shaft" should be construed as meaning hereinafter any rotary member, whatever may be its shape and operation. A primary transmission of movement connects the driving shaft with said transfer member, while a secondary transmission of movement is provided between said transfer member and the driven shaft.

According to my invention, the fluidtight transmission means are such that an accurately circular translational movement of said transfer member under the action of the driving member is obtained by a primary transmission including either a plurality of synchronized eccentric driving members, the angular setting of which is the same and the eccentricity of which is also the same, or else, a single eccentric driving member associated with guiding means operating over large radial sliding planes, and acting somewhat after the manner of an Oldham joint, so as to ensure the constancy of the angular setting of the transfer member.

Between its section connected positively with the body of the apparatus and its movable section connected positively with the transfer member, the diaphragm, elastic bellows or the like elastic wall inside which the driven shaft passes, is submitted only to the circular translational movement of said transfer member. This leads to a simple translational oscillation of the bellows without any possibility of the bellows rotating round their own axis, whatever may be the value of the torque to be transmitted. The protection of the bellows against all torsional stresses arising through the torque to be transmitted results from the kinematic movement of the system which maintains the transfer member accurately on its circular translational movement, while ensuring an excellent mechanical operation of the movement-transmitting means.

When compared with the known arrangements of rotary fluidtight joints adapted to transmit substantial torques, my improved arrangement allows obtaining fluidtight rotary joints of a simple and sturdy execution, the life of which is very long.

According to the embodiments of my invention, the driven and the driving shafts may be arranged coaxially or otherwise. They may rotate in the same direction or in opposite directions at speeds which are either equal to, higher or lower.

The system is reversible, so that the driving shaft may serve as a driven shaft and reversely.

The fluidtight member may be constituted by elastic bellows or Sylphon tubes or by any suitable diaphragm, simple or multiple.

Said fluidtight member may be made of metal or of any other suitable material.

I will now describe a number of embodiments of my invention, by way of example, reference being made to the accompanying drawings, wherein:

FIG. 1 illustrates diagrammatically the rotary drive of a pinion through the circular translational movement given to an outwardly toothed gear.

FIG. 2 is a diagram similar to FIG. 1 and relates to the drive of a pinion through the circular translational movement given to an inwardly toothed gear provided with inner teeth.

FIG. 3 illustrates diagrammatically the circular translational movements given to a transfer member by the synchronized rotation of two elements of equal driving eccentricities and the angular setting of which is the same.

FIG. 4 is a view of the fluidtight transmission means according to the invention, which operate in conformity with the diagram of FIG. 3, said means being shown cross-sectionally through line IV—IV of FIG. 5.

FIG. 5 is a plan view of the same arrangement after removal of the cover.

FIG. 6 illustrates diagrammatically a modification, wherein guiding means are provided for producing the circular translational movement of the transfer member.

FIG. 7 is a diagrammatic showing of a practical embodiment of the guiding means according to FIG. 6.

FIG. 8 is a cross-sectional view of fluidtight transmission means according to the invention, which means operate in accordance with the diagrams of FIGS. 6 and 7.

Figure 14:
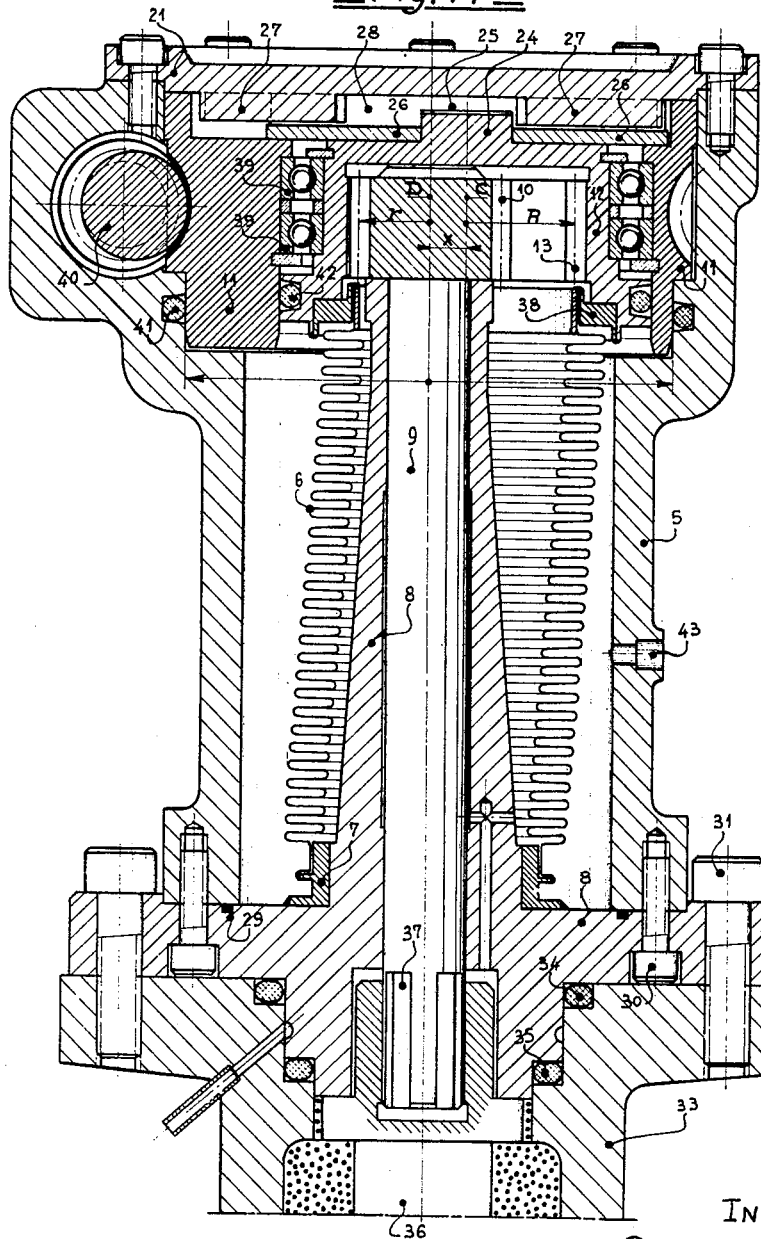

FIGS. 9 to 13 form together an exploded perspective view showing the different elements forming the complete arrangement according to FIG. 8, certain parts being torn off.

FIG. 14 is a sectional view of a further modification of my improved arrangement as applied to the production of molecular vacuum.

FIG. 15 is a diagrammatic elevational view of an arrangement designed for unlimited rotation.

FIG. 16 is a plan view of the arrangement illustrated in FIG. 15.

FIG. 17 is a diagrammatic elevational view of an arrangement designed for rotations of a limited amplitude.

FIG. 18 is a plan view of the arrangement according to FIG. 17.

FIG. 19 is a sectional view of an arrangement executed in accordance with FIGS. 17 and 18.

FIGS. 20 and 21 illustrate, in two different positions, a modification of the driving mechanism.

FIG. 22 is a partial view of a fluid tight transmission arrangement operating in accordance with the diagrams of FIGS. 20 and 21, said view being a cross-section through line XXII—XXII of FIG. 23.

FIG. 23 is a plan view of the same arrangement as in FIG. 22, after removal of the cover.

Turning first to the diagram of FIG. 1, A, B, C, D is a pivotal link motion, of which the apices B and D are stationary. The points C and D form the centers of two interengaging toothed wheels. The movable side AC is rigid with the wheel having as a center C. When the side AB assumes a rotary movement round the point B, the side AC moves always in parallelism with its own direction and drives the wheel having as a center C into a circular translational movement without any rotation of said wheel round its center C, while the wheel having as its center D is driven into rotation by the wheel having as its center C. In said structure, the sides AB and CD have a length equal to the sum of the radii of the two wheels, or, in other words, $R+r$.

Turning to FIG. 2, the sun-and-planet system providing for a circular translational movement is applied to a wheel which is inwardly toothed and has for its center C and a radius equal to R, said wheel driving the pinion having as its center D with a radius $r$. As in the case of FIG. 1, the points B and D are stationary. The outer wheel is cut in a member 1 which is connected through the side AB with the stationary point B. The pivoting sides AB and CD are parallel and have equal lengths, to wit $X=R-r$. As in the case of FIG. 1, when AB assumes a rotary movement round B, the side AC moves always in parallelism with itself, whereby the outer wheel is subjected to a circular translational movement, without rotating round its center C, but it continues driving the wheel having as its center D round its center. During this circular translational movement, each of the points of the member 1 describes a circumference having as a radius $X=R-r$.

FIG. 3 is similar to FIG. 2, but the member 1 is driven into a circular translational movement under the action of the synchronized rotation of the points A and A' round the stationary points B and B'. To this end, it is possible to make the points A and A' rigid with two similar gear wheels 2 and 3 meshing with a common central pinion 4 having its center at D. The member 1 forms the transfer member between the driving pinion 4 and the driven member arranged coaxially with the pinion 4. The movable end of the elastic member separating the two media is fluid tightly secured to the member 1.

The primary transmission between the driving member and the transfer member is constituted by the central pinion 4 and the two pinions 2 and 3 carrying crank pins at A and A', the eccentricity of which is equal to $X=R-r$ with reference to the stationary centers of said pinions B and B'. The secondary transmission between the transfer member and the driven member may be constituted by a third crank pin describing a circle having as its center D, centrally fitted at the point C inside a bore formed in the transfer member.

In this case, when the transfer member has executed a cycle corresponding to one complete revolution of the pinions 2 and 3, the crank having as a center D and a radius $DC=X$ will have also rotated by one complete revolution in the same direction as the transfer member. As in the case of FIG. 2, the secondary transmission may be constituted by a pinion having as its center D, with a pitch radius equal to $r$ and meshing with the inner teeth of the transfer member, the pitch circle of said inner teeth having a radius R and a center C. In such a case, when the transfer member 1 has executed a cycle corresponding to one complete revolution of the gear wheels 2 and 3, the pinion driven by the inner teeth of the transfer member will have revolved in the opposite direction by a value proportional to $$\frac{R-r}{r}=\frac{X}{r}$$

It is apparent that this transmission including a transfer member provided with inner teeth and assuming a circular translational movement and a pinion having a stationary center D may advantageously be provided for a reduction in speed. It is, in fact, of advantage to reduce the value of X and it is possible to select the diameter of the pinion as required.

In the case of continuous rotations executed at a substantial speed, it is possible with such a secondary transmission to provide a limited increase in speed for the driven member. For instance, when it is desired to multiply the speed by two, it is necessary for the eccentricity X to be equal to twice the radius of the pinion. It is then necessary to resort to comparatively long bellows of a suitable diameter, which, in the case of such a doubling of the speed, are subjected to only one cycle of a circular translational movement during a rotation of the primary pinion through two revolutions.

Turning now to FIGS. 4 and 5 which show an embodiment operating in accordance with the diagram of FIG. 3, the primary transmission includes, by way of example, three crank elements arranged at 120° and providing equal eccentricities of a value X.

As shown in FIGS. 4 and 5, the housing of the rotary joint 5 is secured with the interposition of fluidtight packings over the outer surface of the chamber into which the secondary shaft 9 enters, said shaft being guided by a stationary sleeve 8 and separated from the outer medium by the fluidtight bellows or Sylphon tube 6, which latter is welded at one end to a ring 7, which is welded in its turn to the sleeve 8, and at its other end to the transfer member 12.

The secondary transmission shaft 9 having its axis passing through D terminates with a pinion having a radius $r$ and the teeth of which mesh with the inner teeth 13 formed in the transfer member 12 and having a radius R and a center C. The difference between the radii of the pitch circles at 13 and 10 is $X=R-r$.

The transfer member 12 is provided with three bores 14 arranged at 120° from one another and the axes of which are shown at A in FIG. 5. Said bores carry, through the agency of needle bearings 15, eccentric pins 16, 16' and 16" the upper sections of which on the outside of the bores form the pinions 17, the axes of which pass through B, B' and B". The eccentricity between A and each point B, B' and B" is equal to X. Each system 16—17 thus revolves round a spindle 18, the axis of which passes through the corresponding points B, B' and B", with the interposition of needle bearings 19.

The three pinions 17 mesh with the central pinion 20 rigid with the driving shaft and the axis of which coincides with the secondary transmission shaft axis passing through the point D. When the pinion 20 of the primary transmission revolves under the action of the shaft 22, it drives synchronously the pinions 17 and the eccentric pins 16 on the latter. Said synchronous action of the eccentric pins 16 bestows the transfer member 12 carrying said pins revolvably with an accurate circular translational movement without any possible rotation round its own axis C. It is to be noted that one of the three pins 16, 16' and 16", for instance the pin 16 corresponding to axis B, forms a driving member rotating around the axis B under the control of driving shaft 22 while another of the pins, for instance the pin 16' corresponding to axis B' forms a coordinating member. The driving member gives orbital movement to the transfer member 12 and the coordinating member secures a constant orientation to the transfer member 12 during said orbital movement whereby the orbital movement with a constant orientation constitutes a circular translation movement. In fact the three pins 16, 16' and 16" form three elements cooperating for involving said circular translation movement.

The secondary transmission is driven into rotation under the action of said circular translational movement through the action of the teeth 13 on the teeth 10. The Sylphon tube which is rigid with the member 12, at its upper end, is subjected during the rotation of the primary and secondary transmissions merely to a translational shifting without any torsional stress. In said arrangement, the primary shaft 22 and the secondary shaft 9 are coaxial and they revolve in the same direction and may assume equal or different speeds, according to the gear ratio in the primary and secondary transmissions.

When it is desired to operate at a substantial speed, the rotary joint requires dynamic balancing means which are not illustrated. Similarly, it is necessary to provide thrust bearings for absorbing the strains in the transfer member ascribable to the differences in pressure between the inside and the outside of the Sylphon tube and said thrust bearings have not been shown in order not to overcrowd the drawings.

It will be remarked, upon inspection of FIGS. 4 and 5, that the section 23 of the housing 5 carrying the sleeve 8 and also the lower end of the latter are castellated for cooperation, so as to allow the fitting through the upper section of the housing 5 after the Sylphon tube has been welded to the transfer member 12 and to the ring 7 rigid with the sleeve 8. The teeth of the pinions 17 and 20 are preferably cut helically in a careful manner, so that the drive may be performed with a clearance reduced to a minimum.

In the preceding disclosure relating the FIG. 3, the side AA' is started on its circular translational movement, while moving in parallelism with itself and all its points describe a circumference having as a radius X. Said result may be obtained through the synchronized action of only two cranks AB and A'B' having as a radius X.

In the embodiment illustrated in FIG. 6, it is possible to obtain the circular translational movement of AA' by cutting out the action of the cranks A'B' and A"B" and by fitting over the side AC a slider 24 adapted to move in a groove 25 extending in parallelism with BB', said groove 25 being provided in a movable member 26 which may, in its turn, slide freely in the stationary guides 27 along an upward directly which is preferably perpendicular to BB'. Under the action of the single crank AB and as a consequence of the presence of the groove 25 guiding the slider 24 and of the movements of the member 26 in the guides 27, I obtain the desired circular translational movement of the side AC when the crank AB is caused to rotate round its crank B.

In FIG. 7, a single eccentric driving member having an eccentricity equal to X has for its center the point D and acts on the center C of the transfer member 12 to be driven into a circular translational movement. Said member 12 is provided diametrically with a male slider 24 moving, as precedingly, in the groove 25 of the movable member 26, which latter is adapted to move along the stationary guiding member 27 sliding in the groove 28 in a direction perpendicular to the axis of the groove 25.

The rotation round D of the driving element having an eccentricity $X=CD$ as transmitted to the center C of the transfer member 12 bestows the latter, through the agency of the movable guiding member 26, with a circular translational movement which is highly accurate. The angular setting of the transfer member 12 remains unchanged and all its points describe a same circumference having as a radius X.

The movable member 26 in FIGS. 6 and 7 plays the part of a crossed joint with radial sliders operating after the manner of an Oldham joint. Such an assembly is extremely simple and sturdy and its operation is fully reliable.

Turning now to FIG. 8 incorporating the arrangement according to FIG. 7, it shows a driving shaft 22 and a driven shaft 9 which are connected with the transfer member 12 through corresponding cranks having the same eccentricity X.

The crank pins 11 of said cranks are located in registry with each other in corresponding blind bores 14 formed in said transfer member 12. 5 designates again the housing for the rotary joint, 6 the Sylphon tube separating the driven shaft 9 from the outer medium and 8 the guiding sleeve. The upper pin 11 forms a driving member and the element 26 forms a coordinating member whereby the transfer member 12 circularly translates when the driving shaft 22 rotates.

FIGS. 9 to 13 are perspective views of the different components of said rotary joint.

The stationary cover 21 illustrated in FIG. 9 includes a male guiding element 27 engaging the corresponding groove 28 of the crossed joint 26 (FIG. 11). Perpendicularly to the groove 28 and on the opposite side of the crossed joint 26, there is formed a groove 25 in which slides the male element 24 rigid with the upper section of the transfer member 12 (FIG. 12). The latter is provided with two blind bores 14 engaged by eccentric pins 11 on the driving shaft 22 (FIG. 10) and on the driven shaft 9 (FIG. 13), respectively.

In the structure illustrated in FIGS. 8 to 13, the driving and driven shafts are coaxial and revolve at the same speed and in the same direction. The number of cycles of translational circular movements of the member 12 to which the Sylphon tube 6 is secured, is equal to the number of revolutions of the driving and driven shafts.

Turning now to FIG. 14 which illustrates a further embodiment of a fluidtight rotary joint according to my invention, as applicable, by way of example, to a plant producing molecular vacuum, the housing 5 of the joint is secured with the interposition of a static fluidtight packing 29 and through the agency of bolts 30 over the lower end of the guiding sleeve 8. Said lower end is also secured by bolts 31 to the outer section of the apparatus 33 inside which the shaft 36 is to be driven into rotation, while perfect fluidtightness is ensured between the fluid surrounding said shaft and the outer medium. The clamping of the sleeve 8 over the outer section 33 is obtained with the interposition of two fluidtight static packings 34 and 35. The shaft 36 is rigidly secured to the secondary transmission shaft 9 by the pin system 37. Said secondary shaft 9, the axis of which passes through the point D, carries at one end a pinion, the pitch circle of which has a radius $r$, and the teeth 10 of which mesh with the inner teeth 13 having a pitch circle of a radius R with an axis passing through C and formed on the transfer member 12. The difference between the radii of the pitch circles 13 and 10 is equal $R-r=X$; the bellows or Sylphon tube 6 which may be selected, by way of example, as made of stainless steel, is welded at one end to the ring 7, which is welded in its turn to the sleeve 8 and, at its other end, to the lower section of the transfer member 12, through the agency of the ring 38.

The shafts 9 and 36 of the secondary transmission are thus completely separated by the bellows or Sylphon tube 6 from the outer medium. The transfer member 12 is driven into an accurate circular translational movement, through the associated action of the eccentric driving element 11 and of the crossed joint 26, provided with orthogonal sliders. In this commercial execution, the eccentric driving element is constituted by an eccentric peripheral member; the outer surface of which revolvably engaging the housing 5 is axially alined with the point D, while the bore of said member 11 engaging the transfer member 12 is axially alined with the point C. It is apparent that the drive of the transfer member 12 under the action of the eccentric peripheral member is provided with the aid of centering bearings and of an axial thrust bearing, shown at 39, said bearings being adapted to absorb the reactions produced on the transfer member 12 by the differences in pressure between the inside and the outside of the fluidtight bellows 6. The outer surface of the eccentric driving element 11 is provided with a helical cut engaged by the controlling worm 40; as in the case of the precedingly described figures, 27 designates the male guiding part rigid with the stationary cover 21, 24 the other male part formed on the transfer member 12. These two male elements engage the corresponding grooves 28 and 25 formed on the opposite sides of the crossed joint 26 along diameters perpendicular to each other.

The rotation of the worm 40 provides for the drive of the eccentric peripheral member 11 which, in association with the crossed joint 26, imparts to the transfer member 12, an accurate circular translational movement which produces, through the engagement of the teeth 10 and 13, the rotary movement of the shafts 9 and 36, whereas the bellows separating said shafts are subjected to only a reduced work, providing a tilting movement, without the torque to be transmitted urging said bellows into rotation round their axis.

It will be remarked that the primary transmission is separated from the medium inside the sylphon tube by fluidtight packings 41 and 42 extending to either side of the eccentric member 11. This arrangement allows lubricating the entirety of the primary transmission, without any risk of contact with the sylphon tube or bellows, the fluidtightness of which may be checked through the sighting hole 43 provided in the housing 5.

By reason of the large speed reduction between the control worm 40 and the secondary shafts 9 and 36, the structure just described is particularly suitable for the transmission at a lower speed of substantial torques.

In the case of a transmission of substantial torques, the members may slide inside the cross joint 26, with the interposition of needle beds.

In the joints illustrated in FIGS. 4, 8 and 14, the driven member may execute an angular travel as large as may be desired and it may, for instance, execute any number of successive complete revolutions, the arrangement disclosed providing a considerable resistance against wear for the fluidtight member. In certain commercial applications, it may however occur that the driven rotary member has only a limited rotary travel to execute. This is the case, for instance and inter alia, for shut-off systems, the closing member of which, such as a throttle valve or the like, is to execute, under the control of the abovementioned driven member, a travel of a reduced amplitude corresponding, for instance, to one quarter of a revolution, or less, of said rotary driven member. Of course, the above-described arrangements are still more suitable in the case of applications which lead to operative conditions which are less severe than when the rotation of the driven rotary member is continuous. FIGS. 17 to 19 illustrate an advantageous arrangement which is applicable to the case where the rotation of the secondary crank-carrying shaft is equal to one quarter of a revolution or is smaller. FIG. 19 illustrates, furthermore, a modification applicable to unlimited or limited rotations and including two successive insertions of the primary transmission and secondary transmission members, the rotary driving member capping a fraction of the transfer member which caps in its turn a crank controlling the driven rotary member.

Turning to the diagrammatic FIG. 15 illustrating the manner of mounting the bellows in the case of an unlimited rotation of the driven shaft, it is apparent that the lower end of the bellows 6 is welded at 7 to the guiding member 8 which is mounted coaxially with the shafts 9 and 22. The upper section of the bellows 6 is welded at 38 to the transfer member 12 which is centrally carried by the crank pins 11, which latter engage blind bores formed in the member 12. The upper section of the bellows 6 thus connected at 38 with the transfer member 12, as shown in FIG. 16, is again shifted by a length X with reference to its lower end 7. During a complete cycle of movement of the transfer member, the circular translational shifting of the upper section of the bellows lies within a circle 44 forming an envelope having its center at O and the radius of which is $E=e+X$, $e$ being the radius of the bellows.

Turning now to FIGS. 17 and 18, showing how the bellows or sylphon tube may be mounted when the rotation of the driven member is to be limited to an angle MON selected, by way of example, as equal to 90° with $\alpha=45°$, when the crank pins 11 are located in the vertical bisecting plane passing through the axis GH, it is apparent, as shown in FIG. 17, that the lower end 7 and the upper end 38 of the bellows 6 are coaxial with the shafts 9 and 22. The lower end 7 is welded to the guiding member 8 which is, in its turn, centrally fitted, as illustrated in FIG. 15, with reference to the axis of the coaxial shafts 9, 22. The upper section 8 of the bellows is welded at 38 to the transfer member 12.

As an advantage of said structure, the bellows are not subjected to any straining during operation for a position of the crank pins extending in the vertical bisecting plane of the operative angle passing through GH. When the two crank pins 11 enter, after a rotation of $\alpha=45°$, the plane OM, the center of the upper section of the bellows is shifted from O to O1, after moving over one eighth of the periphery of the circumference having as a radius X and as a center O2. This upper section of the bellows is thus shifted from the position 38 to the position designated by 38a. The value P of said shifting obtained by the circular translational movement is a function of the angle of rotation and of the value of the eccentricity as given by the relationship:

$$P = 2 \times \sin \frac{\alpha}{2}$$

for $\alpha=45°$ $P=0.765$ $X$; for $\alpha=30°$ $P=0.517$ $X$.

For rotations equal to or lower than one quarter of a revolution, the structure illustrated in FIG. 17 shows the further advantage that the shifting of the upper section of the bellows has an amplitude which is clearly lower than the eccentricity X. It is possible, in the case of shut-off systems operating upon rotation through one quarter of a revolution and for an allowable value of the above-defined shifting P, to resort to an eccentricity X which is comparatively large and thereby favorable for the transmission of torques. It is still more advantageous to apply said structure to a throttle valve serving for adjustment or regulation purposes. Generally speaking, for such uses, the throttle valve has a total angle of rotation of a magnitude of 60°, which provides a maximum shifting of the bellows equal to about one half of the eccentricity X. Furthermore, all the movements of the throttle valve in an area adjacent the bisecting line of the total angle of rotation lead only to a very small shifting P of the upper section of the bellows. It is thus possible to execute, for such an application, rotary fluidtight joints, the bellows in which are capable of a long service.

Turning now to FIG. 19 which relates to a fluidtight rotary joint incorporating the arrangement which has just been described, the driving member 45 fitted above and coaxially with the shaft 9, is carried inside the stationary member 46, with the interposition of two superposed bearings 47. This member 45 is provided with a bore 48, the eccentricity of which is equal to X, and which caps, with the interposition of needle bearings 49, the part of the transfer member 12 inside which the crank pin 11 is fitted. The two cranks 48 and 11, which are thus constituted, instead of facing each other, interengage each other, whereby the stresses are restricted to the plane of the crossed joint 26. The latter is provided, as precedingly disclosed, with radial slideways or grooves for the movement of sliders therein. The parts 24 forming the male projecting element on the member 12, slide thus in one of the grooves formed in the member 26. The other groove formed in the disc member perpendicularly to last-mentioned groove and which is not illustrated in FIG. 19, is engaged by the male parts rigid with the stationary member 46. The sylphon tube is welded at its lower end to the support or pedestal 7 carrying the sleeve 8 which is, as precedingly, arranged coaxially with the shaft 9.

The upper end of the bellows or sylphon tube is welded at 38 to the depending section of the transfer member 12, which section is centered, in the case illustrated, with reference to the shaft 9. The driving member 45 is driven into rotation by the drum 50, the rotary axis of which registers with that of the shaft 9 and with that of the outer rotary surface of the member 45. The drum 50 carries an adjustable lever 51, of which the crank pin 52 is adapted to engage directly the control rod forming part of an auxiliary motor or the like prime mover actuated, for instance, by compressed air. The roller bearings 47 and 53 absorb the axial thrust which may arise as a consequence of the differences in pressure between the inside and the outside of the bellows or sylphon tube 6.

In the precedingly described structures incorporating a single eccentric driving member, I have resorted to conventional eccentric members, whatever may be their type, such as cranks, the crank pins on which are in registry, peripeheral eccentric members, eccentric members fitted inside each other with the interposition of the transfer member. Now, it is also possible, as illustrated in FIGS. 22 and 23, to use as an eccentric driving member any other suitable arrangement such, for instance, as the central sliding member of an Oldham joint, the two flange-carrying shafts of which are shifted by a distance $Y=2X$ and are driven together by the primary shaft. The starting into an accurate circular translational movement of the transfer member is again obtained in such a case by the action of the crossed joint or floating disc member provided with orthogonally acting tongues or sliders, as described precedingly.

FIG. 20 illustrates two parallel flanges 54 and 55, the axes of which are shifted by a distance, Y, while their operative rotary connection is ensured by the floating disc member having as its central point the point 56, the whole arrangement forming an Oldham joint.

In the case illustrated in FIG. 21, each of the flanges 54 and 55 is assumed to have turned by an angle α with reference to the position illustrated in FIG. 20 and it is apparent that the center 56 of the floating disc or cross-member has rotated by an angle equal to 2α along a circumference having as a diameter $Y=2X$.

The secondary transmission illustrated in FIGS. 22 and 23 is identical with that illustrated in FIG. 14. The transfer member 12 is driven by the movable cross-member 56 forming the central floating disc of an Oldham joint, wherein the lower flange 55, the axis of which passes through the point T, revolves inside the bore 57, while the upper flange 54 having as a center S, revolves inside the bore 58. The spacing between T and S is equal to $Y=2X$. The two plates 54 and 55 include each a toothed section meshing with a common pinion 59 rigid with the control shaft 60 extending along the line passing through U.

Each surface of the disc 56, as illustrated in FIG. 23, is provided with two diametrically alined male elements or tongues 61, the elements on one surface of said disc being perpendicular to those on the other surface. Said tongues slide in corresponding grooves or slots formed in the flanges 54 and 55. The associated crossed-joint disc 26 is, as precedingly, provided with grooves 25 and 26 for the male elements 24 and 27. The structure has for its advantage the driving of the transfer member 12 into a circular translational movement without the assistance of any actual eccentric member. It is thus possible to produce a torque with a low value of X, without any risk of wedging. When the flanges 54 and 55 have been angularly shifted by one complete revolution, the center of the disc 56 will have described twice the periphery of the circumference having as a diameter TS and the transfer member 12 will have then executed two cycles of its circular translational movement.

What I claim is:

1. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows primary transmission means between said driving shaft and said transfer member for imparting to said transfer member a circular translation movement when said driving shaft rotates, said primary transmission means including a driving member for imparting orbtial movement to said transfer member and a coordinating member for securing a constant orientation to said transfer member during said orbital movement whereby said orbital movement with a constant orientation constitutes said circular translation movement, said driving member rotating around a first stationary axis under the control of said driving shaft and being pivotally connected to said transfer member around a second axis parallel to said first axis, said coordinating member being movable with respect to said frame and with respect to said transfer member, first guiding means for connecting said coordinating member with said frame, second guiding means for connecting said transfer member with said coordinating member, and secondary transmission means between said transfer member and said driven shaft for imparting rotational motion to said driven shaft when said transfer member circularly translates.

2. A fluidtight transmission device between a driving shaft and a driven shaft comprising stationary frame, a movable transfer member, a sealing bellows extending between said frame and said transfer member, said bellows being annular and said transfer member including a fluid-tight portion limited by said annular bellows primary transmission means between said driving shaft and said transfer member for imparting to said transfer member a circular translation movement when said driving shaft rotates, said primary transmission means having at least two elements rotating around two first stationary axes respectively under the control of said driving shaft and being pivotally connected to said transfer member around two second axes respectively, the four said axes being parallel and having a cross-sectional parallelogram configuration, and secondary transmission means between said transfer member and said driven shaft for imparting rotational motion to said driven shaft when said transfer member circularly translates.

3. A fluidtight transmission device as defined in claim 2 wherein said primary transmission means further comprise at least a third element rotating around a fifth stationary axis under the control of said driving shaft and being pivotally connected to said transfer member around a sixth axis, the six said axes being parallel and having a cross-sectional star-shaped three parallelogram configuration.

4. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows primary transmission means between said driving shaft and said transfer member for imparting to said transfer member a circular translation movement when said driving shaft rotates, said primary transmission means including a driving member for imparting orbital movement to said transfer member and coordinating member for securing a constant orientation to said transfer member during said orbital movement whereby said orbital movement with a constant orientation constitutes said circular translation movement, said driving member rotating around a first stationary axis under the control of said driving shaft and being pivotally connected to said transfer member around a second axis parallel to said first axis, said coordinating member being movable with respect to said frame and with respect to said tarnsfer member and being formed by a flat annular circular disc having two opposed faces, a first rectilinear sliding means on one of said faces, a first rectilinear counter-sliding means on said frame, said first sliding means and counter-sliding means being engaged with each other, a second rectilinear sliding means on the other of said faces and being disposed at an angle with respect to said first sliding means, a second rectilinear counter-sliding means on said transfer member, said second sliding means and counter-sliding means being engaged with each other, and secondary transmission means between said transfer member and said driven shaft for imparting rotational motion to said driven shaft when said transfer member circularly translates.

5. A fluidtight transmission device as defined in claim 4 wherein said angle is 90°.

6. A fluidtight transmission device as defined in claim 4 wherein said sliding means are diametrical.

7. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member rotating around a first stationary axis under the control of said driving shaft and being pivotally connected to said transfer member around a second axis parallel to said first axis, said coordinating member being movable with respect to said frame and with respect to said transfer member and being formed by a flat annular circular disc having two opposed faces, a first rectilinear sliding groove in one of said faces open at said disc periphery, a first rectilinear counter-sliding rib means on said frame, said first groove and rib means being engaged with each other, a second rectilinear sliding groove in the other of said faces open at said disc periphery and being disposed at an angle with respect to said first groove, a second rectilinear counter-sliding rib means on said transfer member, said second groove and rib means being engaged with each other, and secondary transmission means between said transfer member and said driven shaft for imparting rotational motion to said driven shaft when said transfer member circularly translates.

8. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member being rigid with said driving shaft for rotating around a first stationary axis under the control of said driving shaft and being pivotally connected to said transfer member around another axis parallel to said first axis, said coordinating member being movable with respect to said frame and with respect to said transfer member, first guiding means for connecting said coordinating member with said frame, second guiding means for connecting said transfer member with said coordinating member, and secondary transmission means between said transfer member and said driven shaft for imparting rotational motion to said driven shaft when said transfer member circularly translates.

9. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member being mounted for rotation on said frame around a first stationary axis, a first toothed portion on said driving shaft, a second toothed portion on said driving member, said toothed portions meshing with each other for rotating said driving member around said first axis under the control of said driving shaft, said driving member being pivotally connected to said transfer member around a second axis parallel to said first axis, said coordinating member being movable with respect to said frame and with respect to said transfer member, first guiding means for connecting said coordinating member with said frame, second guiding means for connecting said transfer member with said coordinating member, and secondary transmission means between said transfer member and said driven shaft for imparting rotational motion to said driven shaft when said transfer member circularly translates.

10. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows, primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving shaft having a toothed portion, two plates mounted for rotation on the frame and having toothed portions meshing with said driving shaft toothed portion, said driving member being engaged with said two plates so as to rotate around a first stationary axis under the control of said driving shaft and being pivotally connected to said transfer member around a second axis parallel to said first axis, said coordinating member being movable with respect to said frame and with respect to said transfer member, first guiding means for connecting said coordinating member with said frame, second guiding means for connecting said transfer member with said coordinating member, and secondary transmission means between said transfer member and said driven shaft for imparting rotational motion to said driven shaft when said transfer member circularly translates.

11. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows, primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member rotating around a first stationary axis under the control of said driving shaft, said driving member having a spindle, said transfer member having a pivot recess, said spindle being journaled in said pivot recess so as to pivotally connect said driving member to said transfer member around a second axis parallel to said first axis, said coordinating member being movable with respect to said frame and with respect to said transfer member, first guiding means for connecting said coordinating member with said frame, second guiding means for connecting said transfer member with said coordinating member, and secondary transmission means between said transfer member and said driven shaft for imparting rotational motion to said driven shaft when said transfer member circularly translates.

12. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows, primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member rotating around a first stationary axis under the control of said driving shaft and having a pivot recess, said transfer member being journaled in said pivot recess so as to pivotally connect said driving member to said transfer member around a second axis parallel to said first axis, said coordinating member being movable with respect to said frame and with respect to said transfer member, first guiding means for connecting said coordinating member with said frame, second guiding means for connecting said transfer member with said coordinating member, and secondary transmission means between said transfer member and said driven shaft for imparting rotational motion to said driven shaft when said transfer member circularly translates.

13. A fluidtight transmission device between a driving shaft and a driven shaft comprising a sationary frame, a movable transfer member, a sealing bellows extending between said frame and said transfer member, said bellows being annular and said transfer member including a fluid-tight portion limited by said annular bellows, primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member rotating around a first stationary axis under the control of said driving shaft and being pivotally connected to said transfer member around a second axis parallel to said first axis, said coordinating member being movable with respect to said frame and with respect to said transfer member, first guiding means for connecting said coordinating member with said frame, second guiding means for connecting said transfer member with said coordinating member, said transfer member having a first internally toothed portion, said driven shaft having a second toothed portion, said toothed portions being in mesh with each other for imparting rotational motion to said driven shaft when said transfer member circularly translates.

14. A fluidtight transmission device between a driving shaft and a driven shaft comprising a stationary frame, a movable transfer member, a sealing bellows extending between said frame and said transfer member, said bellows being annular and said transfer member including a fluid-tight portion limited by said annular bellows, primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member rotating around a first stationary axis under the control of said driving shaft and being pivotally connected to said transfer member around a second axis parallel to said first axis, said coordinating member being movable with respect to said frame and with respect to said transfer member, first guiding means for connecting said coordinating member with said frame, second guiding means for connecting said transfer member with said coordinating member, said transfer member having a pivot recess, said driven shaft having a spindle, said spindle being journaled in said pivot recess for imparting rotational motion to said driven shaft when said transfer member circularly translates.

15. A fluidtight transmission device between a driving shaft and a driven shaft, the driven shaft angular stroke being at most 90°, comprising a stationary frame, a movable transfer member, an annular sealing bellows mounted on said frame and on said transfer member so as to be coaxial with the driven shaft when said driven shaft is at the said stroke middle position, said transfer member including a fluid-tight portion limited by said annular bellows, primary transmission means between said driving shaft and said transfer member for imparting to said transfer member a circular translation movement when said driving shaft rotates, said primary transmission means including a driving member for imparting orbital movement to said transfer member and a coordinating member for securing a constant orientation to said transfer member during said orbital movement whereby said orbital movement with a constant orientation constitutes said circular translation movement, said driving member rotating around a first stationary axis under the control of said driving shaft and being pivotally connected to said transfer member around a second axis parallel to said first axis, said coordinating member being movable with respect to said frame and with respect to said transfer member, first guiding means for connecting said coordinating member with said frame, second guiding means for connecting said transfer member with said coordinating member, and secondary transmission means between said transfer member and said driven shaft for imparting rotational motion to said driven shaft when said transfer member circularly translates.

References Cited in the file of this patent

UNITED STATES PATENTS

| | | |
|---|---|---|
| 908,529 | Williams | Jan. 5, 1909 |
| 1,260,243 | Moore | Mar. 19, 1918 |
| 2,114,343 | Gideon | Apr. 19, 1938 |
| 2,358,049 | Bogart | Sept. 12, 1944 |
| 2,770,139 | Shen et al. | Nov. 13, 1956 |
| 2,771,781 | Ranson | Nov. 27, 1956 |
| 2,852,041 | Stinson | Sept. 16, 1958 |
| 2,863,336 | Parstorfer | Dec. 9, 1958 |
| 2,878,348 | Hydon et al. | Mar. 17, 1959 |